United States Patent
Sortwell

Patent Number: 5,882,605
Date of Patent: Mar. 16, 1999

[54] REACTOR FOR THE PRODUCTIONS OF FLOWABLE VISCOUS PRODUCTS

[75] Inventor: Edwin T. Sortwell, Wheaton, Ill.

[73] Assignee: Sortwell & Co., Wheaton, Ill.

[21] Appl. No.: 783,007

[22] Filed: Jan. 14, 1997

Related U.S. Application Data

[63] Continuation-in-part of Ser. No. 711,411, Sep. 5, 1996, abandoned.

[51] Int. Cl.⁶ ............................ B01J 19/24; B01J 19/00; C08F 2/00
[52] U.S. Cl. .......................... 422/135; 422/224; 422/226; 422/236; 422/241
[58] Field of Search .................................... 422/224, 226, 422/230, 234, 236, 237, 242, 135, 241; 366/101, 347, 348

[56] References Cited

U.S. PATENT DOCUMENTS

| | | | |
|---|---|---|---|
| 3,203,674 | 8/1965 | Watson | 259/3 |
| 3,709,641 | 1/1973 | Sarem | 425/7 |
| 3,828,988 | 8/1974 | Berry | 222/389 |
| 3,843,026 | 10/1974 | Giovannozzi | 222/389 |
| 4,095,952 | 6/1978 | Schmidt et al. | 23/260 |
| 4,147,657 | 4/1979 | Kovanda et al. | 252/313 |
| 4,177,240 | 12/1979 | Dal Bianco | 422/115 |
| 4,595,565 | 6/1986 | Tenhagen | 422/133 |
| 4,721,235 | 1/1988 | Watson | 222/389 |
| 4,857,241 | 8/1989 | Straw et al. | 261/152 |
| 5,114,054 | 5/1992 | Watson | 222/389 |
| 5,236,669 | 8/1993 | Simmons et al. | 422/113 |
| 5,248,484 | 9/1993 | Scott et al. | 422/225 |
| 5,330,073 | 7/1994 | Collins et al. | 222/52 |
| 5,341,726 | 8/1994 | Watson | 92/80 |
| 5,435,468 | 7/1995 | Clark, II | 222/389 |

FOREIGN PATENT DOCUMENTS

| | | |
|---|---|---|
| 5-57181 | 3/1993 | Japan . |
| 1054028 | 1/1967 | United Kingdom . |

OTHER PUBLICATIONS

"Shell Bulk Grease Service" brochure (1976).

*Primary Examiner*—N. Bhat
*Attorney, Agent, or Firm*—Marshall, O'Toole, Gerstein, Murray & Borun

[57] ABSTRACT

A reactor for the production or formulation of flowable viscous products is equipped with an internal piston which assists in the removal of product from the reactor interior.

18 Claims, 3 Drawing Sheets

സ്5,882,605

REACTOR FOR THE PRODUCTIONS OF FLOWABLE VISCOUS PRODUCTS

CROSS-REFERENCE TO RELATED APPLICATION

This is a continuation-in-part of commonly assigned U.S. patent application Ser. No. 08/711,411 filed Sep. 5, 1996, now abandoned the entire disclosure of which is incorporated herein by reference.

BACKGROUND OF THE INVENTION

1. Field of the Invention

This invention relates generally to a chemical reaction vessel that can be used for the in situ preparation of flowable viscous products. The reaction vessel incorporates an internal piston that assists in the removal of reaction products from the interior of the vessel.

2. Related Technology

Chemical reactors or reaction vessels used in the production of viscous products often suffer from reduced yields because the reaction product cannot be completely removed from the reactor. An added complication in producing viscous products is the effort and expense in cleaning the reactor for re-use. In addition to reactor down-time, cleaning often produces large volumes of sometimes hazardous or difficult-to-dispose-of waste. Indeed, the volume of waste material from the cleaning operation may exceed the volume of the reactor itself.

The use of pistons or piston-like devices for discharging flowable viscous products from vessels used for the transport or storage of semisolid fluid materials is disclosed in several patents. For example, Watson U.S. Pat. No. 5,341,726 describes an elongated transport tank having a cylindrical piston with a radial, annular seal. The piston is sized so that its periphery bears against the walls of the transport tank to assist in the removal of viscous products. Other examples of the use of internal pistons to remove viscous materials from the interior of storage or transport tanks are depicted in U.S. Pat. Nos. 3,203,674, 3,828,988, 4,721,235, and 5,114,054.

Chemical reaction vessels, which are capable of operating at elevated temperatures and pressures and in the presence of solvents and/or corrosive chemicals, present a different environment from that of a storage or transport vessel.

U.S. Pat. No. 3,709,641 discloses an apparatus for preparing non-flowable gelatinous materials. The apparatus includes a closed reaction vessel that has a vertically-movable internal piston that is used to discharge non-flowable, semi-solid material onto an extrusion head. The apparatus is designed so that the piston fits loosely, i.e., the juncture of the piston with the reaction vessel is not fluid-tight. Because the apparatus would allow flowable materials to migrate around the periphery of the piston, the device depicted in U.S. Pat. No. 3,709,641 would not overcome the problem addressed by the invention.

SUMMARY OF THE INVENTION

It is an objective of the invention to overcome one or more of the problems described above.

Accordingly, the invention provides a piston-containing chemical reactor that can be used to prepare flowable viscous products. These types of products can be prepared within the reactor without the need for an internal agitator, and the products can be totally discharged, under pressure, dispensing with the need for special cleaning and eliminating the production of large volumes of waste materials.

The reactor includes a hollow tank with valves for the passage of fluids into and out of the reactor and for the removal of flowable viscous material from the tank, means for uniformly adding reactants and mixing fluids in the tank, a movable piston sealingly engaging the interior of the tank, and means for moving the piston within the tank.

Other objects and advantages of the invention may be apparent to those skilled in the art from a review of the following detailed description, the drawings, and the appended claims.

DETAILED DESCRIPTION OF THE INVENTION

Figure 1:
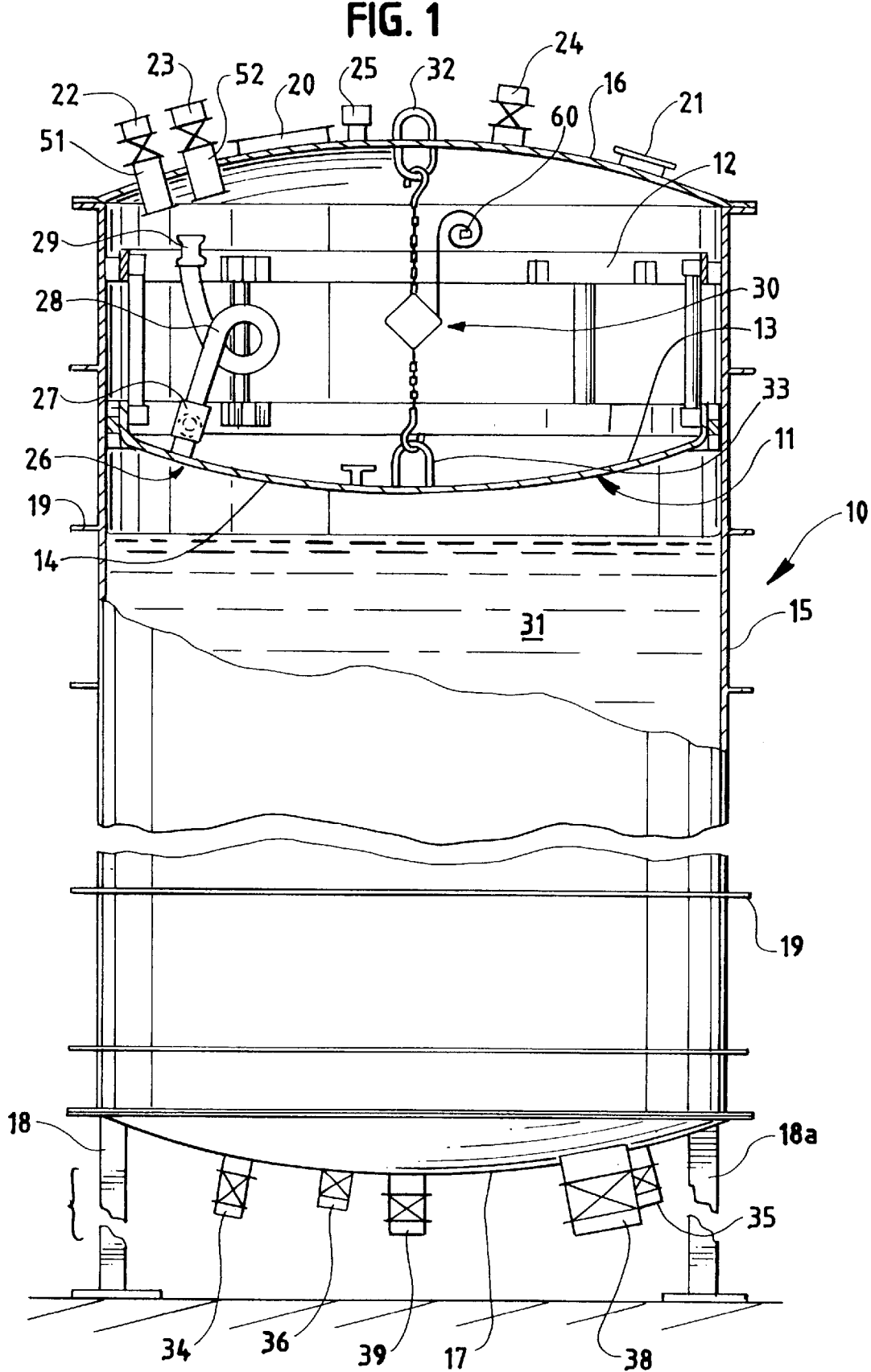
FIG. 1 is a fragmentary elevational view, partly in section, showing a vertical reaction vessel of the invention.

The chemical reactor of the invention is adapted for the synthesis or formulation of flowable viscous materials, although the reactor can be employed of the preparation of non-viscous products. In its preferred form, the chemical reactor is an elongated, hollow, tank-like structure, having sidewalls defining a cylindrical main body, preferably having its major axis in the vertical plane or the horizontal plane. (The major axis of the cylindrical body may be disposed at any desired angle between the vertical and horizontal, however.) As is customary with such vessels, inlets adjacent the ends of the reactor communicate with valves which, when open, permit the influx and discharge of fluids (liquids and gases) into and out of the reactor. When these valves are closed, the interior of the reaction vessel is a closed system, capable of withstanding greater than atmospheric pressures.

The chemical reactor also contains a cylindrical piston inside the vessel for assisting in the discharge of flowable viscous material from the interior. The diameter of the piston is approximately equal to the cross-sectional diameter of the reactor main body. A seal extends radially outwardly from the annular periphery of the piston, and engages with the vessel's interior sidewall. As a consequence, when a valve connected to a discharge port is opened and pressure is applied to the face of the piston opposite the discharge valve by means of a pressurized fluid such as compressed air, the piston will move in the direction of the open valve, exerting a wiping action on the reactor sidewalls as it proceeds. In one preferred embodiment, in the vertical configuration the discharge port will be adjacent the bottom of the reactor and the piston will move from top to bottom during the discharge cycle. Maintaining the cylinder at the top of the reactor and above the reactant's level until discharge allows the reactants to be freely circulated by an external recirculation pump that induces mixing in the reactor, and lessens contact of the reactants with the seal. Although any non-reactive fluid can be used to move the piston during the discharge cycle, air pressure is preferred.

In the vertical configuration, the reactor piston has a fluid passageway between the piston's respective top and bottom surfaces. This passageway connects with a normally-open piston check valve, permitting the venting of the reaction or the circulation of gases through the reaction mixture during operation. When pressure is applied to the top of piston during the reactor-emptying cycle, and the piston is brought into contact with the reactor contents, the check valve closes, preventing bleed-through of product.

In the horizontal configuration, reactants may be introduced through a removable dispensing tube along the bottom of the reactor. Dispersing of reactants and agitation of reactor contents will be accomplished by gas injection through the same tube. In the horizontal configuration, low viscosity reactants will be in contact with the piston seal. It is preferable not to apply pressure until the reaction is at least partially complete.

In any configuration, the reactor also optionally has a device for determining the position of the piston within the reaction vessel. A preferred apparatus is a laser indicator that comprises a laser source mounted on the top or end portion of the reactor, a transparent port for shining the beam downwardly or horizontally into the reactor, and a target plate on a piston surface. Alternatively, a linear distance transducer can be mounted inside the reactor, if environmental conditions allow.

After product has been removed from the reaction vessel, the piston can be returned to its top or end position by means of a hoist, air pressure, or the like. If a hoist is used, as in the vertical configuration, for example, the piston check valve is open, thus allowing a common pressure to be maintained on both sides of the piston while it is being lifted to its starting position in the reactor. In the horizontal configuration, air may be used to position the piston.

The walls of the reactor may be fabricated of a FIBER-GLAS® resin or a similar material that is capable of withstanding pressures up to 10 psig. However, the use of steel (preferably stainless steel) or other more rugged material allows greater pressures to be employed (up to 30 psig or higher). The reactor may also have external heating and cooling coils.

In a preferred embodiment, the annular periphery of the piston has a pair of circumferential flanges extending radially outwardly from the piston member. The flanges are axially spaced apart to define a circumferential channel. An elastic expandable annular seal may be disposed at least partly within and carried by the channel.

The seal has an annular base and an annular crown disposed radially outwardly of and joined to the base. The base has an inwardly facing surface engageable with the piston member and an outwardly facing surface. The crown has side surfaces, an inwardly facing surface opposing the outwardly facing surface of the base, and an outwardly facing surface engageable with the interior surface of the reactor. The outwardly facing surface of the crown has sloping surface portions. The outwardly facing surface of the base and the inwardly facing surface of the crown define an annular fluid chamber. The seal also has a fluid inlet port for introducing fluid into and removing fluid from the fluid chamber for expanding the seal so that it can more tightly press against the interior surface of the reactor sidewalls, thereby providing better wiping action.

The seal should be fabricated from a material that is appropriate to the intended use, i.e., a material that can withstand chemical attack. Nitrile, neoprene, and silicone rubbers are suitable materials. The seal can also have a low-friction cover or coating manufactured, for example, from a polytetrafluoroethylene (e.g., TEFLON®) polymer, or nylon.

Preferably, the piston further includes anti-canting members extending radially outwardly from the periphery of the piston for preventing the piston from canting as it moves within the reactor.

Reactants may be introduced into the reactor by means of a pump. In the vertical configuration, reactants are introduced into the chemical reaction vessel by means of a recirculating pump having an outlet (pump discharge) line that connects with an inlet valve that is disposed in the center of the bottom portion of the reactor. In addition to introducing reactants into the vessel, the recirculating pump can be used for adding diluents, for heating and cooling, and for mixing the reactants. In a preferred method, in the vertical configuration reactants are discharged from a plurality of valved outlets around the bottom of the reactor, through the recirculating pump, and back into the reactor center bottom inlet to induce mixing of the reactants. Mixing in the vertical reactor may be accelerated by the introduction of gas into the recirculating pump discharge line. After all of the reactants have been added, the chemical reactor is maintained at the proper reaction conditions, with the piston preferably above and out of contact with the reactants, until the reaction is complete.

In the horizontal configuration, reactants are introduced uniformly by a pump along the length of the reactor by means of a lance inserted through a packed gland on the discharge end of the reactor. Individual discharge points each have a monitored flow so as to ensure uniform concentration of reactants along the length of the reactor. Discharge ports may be located every two to three feet along the lance. Gas is added through these same discharge ports to agitate and/or purge reactants. When the reaction has initiated, the lance is withdrawn.

When the reaction is complete, a discharge port in the bottom or end portion of the reactor is opened, allowing the reaction product to be discharged. In order to ensure maximum recovery of product, pressure is applied through one end of the reaction vessel, to a surface of the piston, by means of gas pressure (e.g., an air pressure pump or similar device). Gas pressure causes the piston to advance in a downward or horizontal direction, assisting in the removal of product from the reaction vessel interior. The pressure and wiping action exerted by the piston results in higher recovery of product, eliminating or lowering down-time to clean the reactor, and eliminating or reducing the amount of waste material to be disposed of.

In the horizontal configuration, the reactor may be in the form of an elongated transport tank.

The foregoing discussion has focused on the use of the vessel as a chemical reactor. The vessel in either the vertical or horizontal configuration can also be used in processes which involve the mixing or formulation of flowable viscous products.

Vertical Configuration

Referring now to the accompanying drawings, FIG. 1 depicts a chemical reactor or reaction vessel 10 having a vertical cylindrical sidewall 15, a top section 16, and an internally-concave bottom section 17. A pair of supports 18, 18a hold the elongated reactor 10 in an upright position.

Support rings 19 around the periphery of the sidewall 15 add rigidity to the structure.

Figure 2:
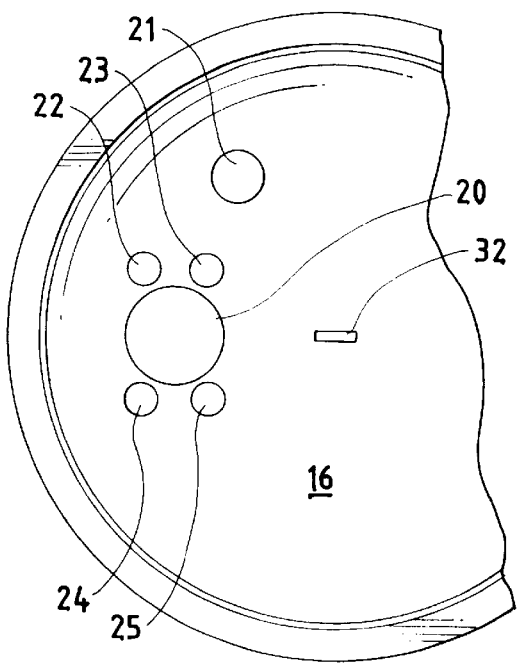
FIG. 2 is a fragmentary top view of the vessel of FIG. 1.

Referring to FIGS. 1 and 2, the reactor top section 16 has a manway 20, a rupture disc 21, and valves 22, 23, and 24 for passage of fluids and other materials into and out of the reactor 10. The reactor 10 also contains a movable internal piston 11 that is supported by a piston frame 12. A laser level indicator 25 mounted on the top section 16 is used to measure the position of the piston 11 in the reactor 10.

The piston 11 has a top surface 13 and a curved (convex) bottom surface 14, which are interconnected by a fluid passage 26, which permits the flow of fluid between the top and bottom surfaces 13 and 14. The bottom surface 14 can mate with the tank bottom section 17. A normally-open ball check valve assembly 27 is connected to the passage 26 for controlling the flow of fluid across the piston 11. A hose 28 having a quick connect fitting 29 permits the assembly 27 to be joined to either the intake valve 22 or the exhaust valve 23, through fittings 51, 52.

An electric or air-powered hoist assembly 30 interconnects an upper ring 32 on the reactor top section 16 and a lower ring 33 on the piston 11. A power source 60 supplies motive force to the hoist assembly 30, which is used to raise the piston 11 to the top of the reactor 10, and to lock and hold it in that position until such time as it becomes necessary to discharge the contents of the reactor, designated 31.

Figure 4:
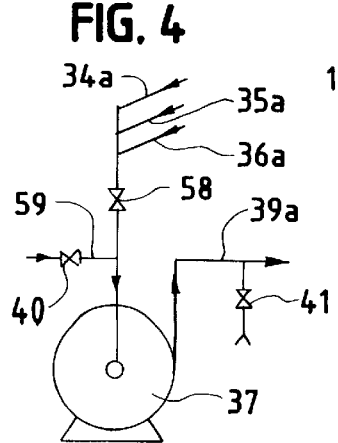
FIG. 4 is a diagrammatic view showing a pump and lines for introducing and removing fluids from the vessel of FIG. 1.
Figure 3:
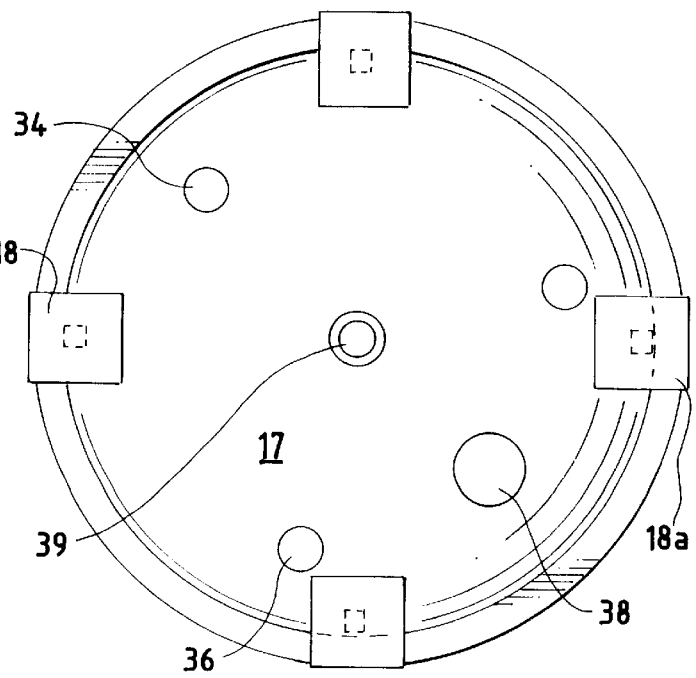
FIG. 3 is a bottom view of the vessel of FIG. 1.

Referring now to FIGS. 1, 3, and 4, the bottom section 17 of the reactor 10 contains flush-fitting outlet flanges and valves 34, 35, and 36 for connection to respective inlet lines 34a, 35a, and 36a of a recirculation pump 37. The outlet flanges and valves 34, 35, and 36 are evenly distributed on the bottom section 17, away from the center thereof. A flow control valve 58 interconnects the inlet lines 34a, 35a, and 36a to the pump 37. The reactor bottom section 17 also contains a product outlet valve 38 for removing the reactor contents 31 from the vessel 10, and a centrally-located pump inlet valve 39 for connection to an outlet line 39a of the recirculation pump 37.

A pump inlet valve 40 (FIG. 4) in a reactant supply line 59 connects the recirculation pump 37 to a reactant source (not shown) for the initial addition of fluid reactants to the reactor 10, through the pump outlet line 39a. The inlet valve 40 can also be used for the addition of any diluents during reaction. The outlet line 39a of the pump 37 is equipped with an a gas inlet valve 41 that can be used, for example, to pass an inert gas into the reactor 10 (via the valve 39) through the reactor contents 31. The inert gas exits the reactor 10 through the passage 26 and the hose 28, which is connected to the exhaust valve 23 by the quick connect fitting 29.

After the reactants have been introduced into the reactor 10, the recirculation pump 37 is used to withdraw the reactor contents 31 through peripherally-located outlet valves 34, 35, and 36, and to reintroduce the contents 31 into the centrally located valve 39, thus facilitating uniform mixing. The introduction of a gas through the valve 41 during the recirculation process can accelerate mixing within the reactor.

Figure 5:
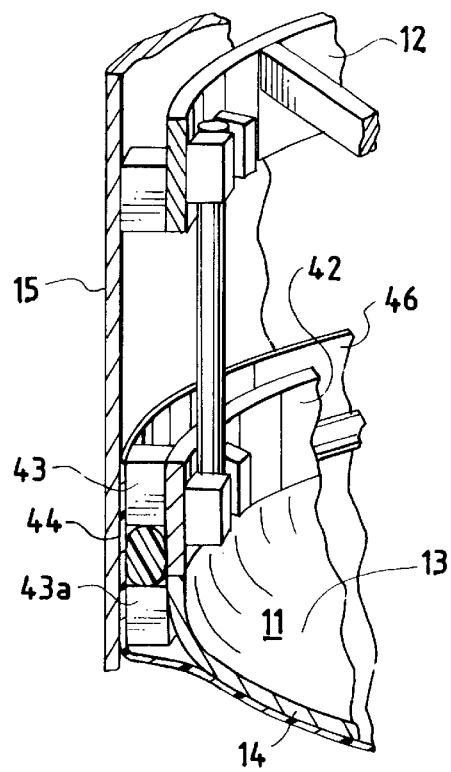
FIG. 5 is a fragmentary section view showing the intersection of the piston with interior wall in the vessel of FIG. 1.

FIG. 5 shows the interaction of the piston 11 with the reactor sidewall 15. The peripheral edge portion 42 of the piston 11 has a pair of flanges 43, 43a that extend radially outwardly thereof. A resilient annular seal 44 is disposed in a channel 45 between the flanges 43, 43a and the piston peripheral edge portion 42. A low-friction cover 46 is disposed between the sidewall 15 and the seal 44 to minimize frictional forces when piston 11 is moved in relationship to sidewall 15.

Referring now to FIGS. 1 and 4, a typical batch preparation sequence for the reactor in the vertical position involves the following steps. The start condition assumes that the piston 11 is nested in the bottom of the reactor 10, adjacent the reactor bottom section 17, with the product from any preceding reaction fully discharged. The following valves and reaction apertures should be in a closed condition: valves 22, 23, 24, 34, 35, 36, 38, and 39 and manway 20. The quick connect fitting 29 is unconnected.

1. Open the valve 24 to vent the piston head, and open the manway 20.
2. Connect the hoist assembly 30 to the rings 32 and 33 and raise the piston 11 to a position adjacent the reactor top section 16 (FIG. 1). Check the laser level 25 to see if it is properly functioning.
3. Connect the quick connect fitting 29 to the fitting 51 on the valve 22, open the valve 22, and introduce a small amount of reactant solvent to flush the check valve 27. Close the valve 22.
4. Disconnect the fitting 29 from the fitting 51 of the valve 22, and reconnect it to the fitting 52 of the exhaust valve 23, which communicates with a vent line (not shown).
5. Connect the reactor outlet valves 34, 35, and 36 to the respective recirculation pump inlet lines 34a, 35a, and 36a. Connect the reactor pump inlet valve 39 to the recirculation pump outlet line 39a, and open the valve 39. Close the flow control valve 58 (FIG. 4) and open the pump inlet valve 40. Activate the pump 37, and fill the reactor 10 to the appropriate level with reactants and diluents. After the reactor 10 has been charged, close the pump inlet valve 40, and open the valves 58 (FIG. 4), 34, 35, and 36 (FIGS. 1 and 3), heating or cooling as necessary.

In this configuration, the reactor contents 31 flow out of the reactor 10 through the valves 34, 35, and 36, and are returned into the reactor 10 through the valve 39. If any additional components are required during the course of the reaction, they can be introduced through the valve 40 while the pump 37 is running to ensure mixing. A gas can be circulated through the reaction contents, through the gas inlet valve 41 (FIG. 4) to accelerate the reaction or to remove volatile products (e.g., undesirable gases or water vapor from a condensation reaction). When the mixing process is complete, the reactor valves 34, 35, 36, and 39 are closed, isolating the pump 37 from the reactor 10.

6. After the reaction has reached completion, disconnect the quick connect fitting 29 from the fitting 52 of the exhaust valve 23 through the open manway 20. Unlock the hoist assembly 30 from the piston 11, allowing the piston 11 to descend onto the now-viscous reactor contents 31. The reactor 10 should be visually checked to ensure both that check valve assembly 27 blocks the passage of the reactor contents 31 onto the piston top surface 13, and that the laser level indicator 25 is operative.
7. Close the vent valve 23 and the manway 20 (FIGS. 1 and 2). Open the top valve 24, which is connected to a source of pressure-regulated gas (not shown). Open the product outlet valve 38 (FIGS. 1 and 3) and discharge the reactor contents 31 out of the reactor 10 (e.g., via a pump, not shown). Maintain piston head pressure on the piston top 13, and observe the descent of the piston 11 using the laser level indicator 25. As the piston 11 descends, the annular seal 44 exerts a wiping action along the interior of the reactor sidewall 15. The concave bottom section 14 of the piston 11 mirrors the curved bottom surface 17 of the reactor 10. Continue discharging until the piston bottom section 14 nests tightly within the curved bottom surface 17, ensuring complete product removal. Close the valves 24 and 38.

Horizontal Configuration

Like reference numerals will be used in the following description to identify components of the invention that are identical to those identified above.

Figure 6:
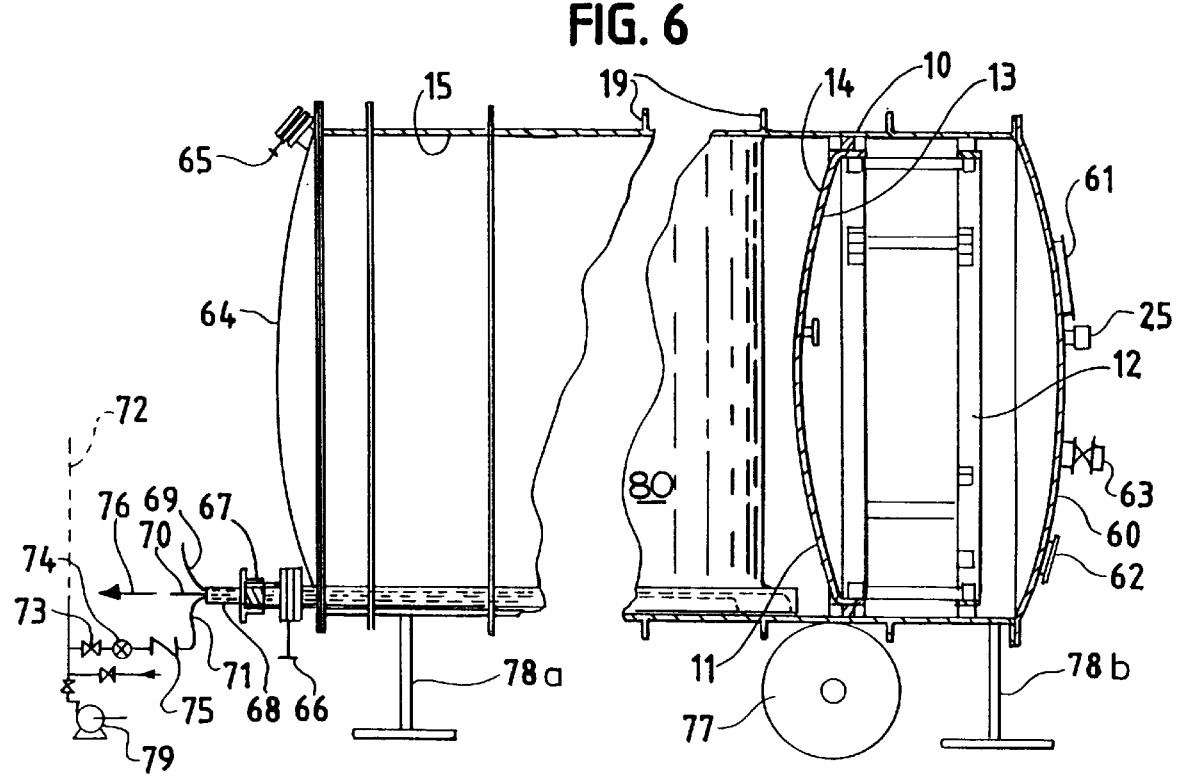
FIG. 6 is a fragmentary elevational view, partly in section showing a horizontal reaction vessel of the invention.

FIG. 6 depicts a chemical reactor or reaction vessel 10 having a horizontal cylindrical sidewall 15, a pressurizing end section 60, and an internally concave discharge section 64. A pair of supports 78a, 78b hold the elongate reactor 10 in a horizontal position. The support 78b may be replaced by wheels 77, if desired. Support rings 19 around the periphery of the sidewall 15 add rigidity to the structure.

Figure 7:
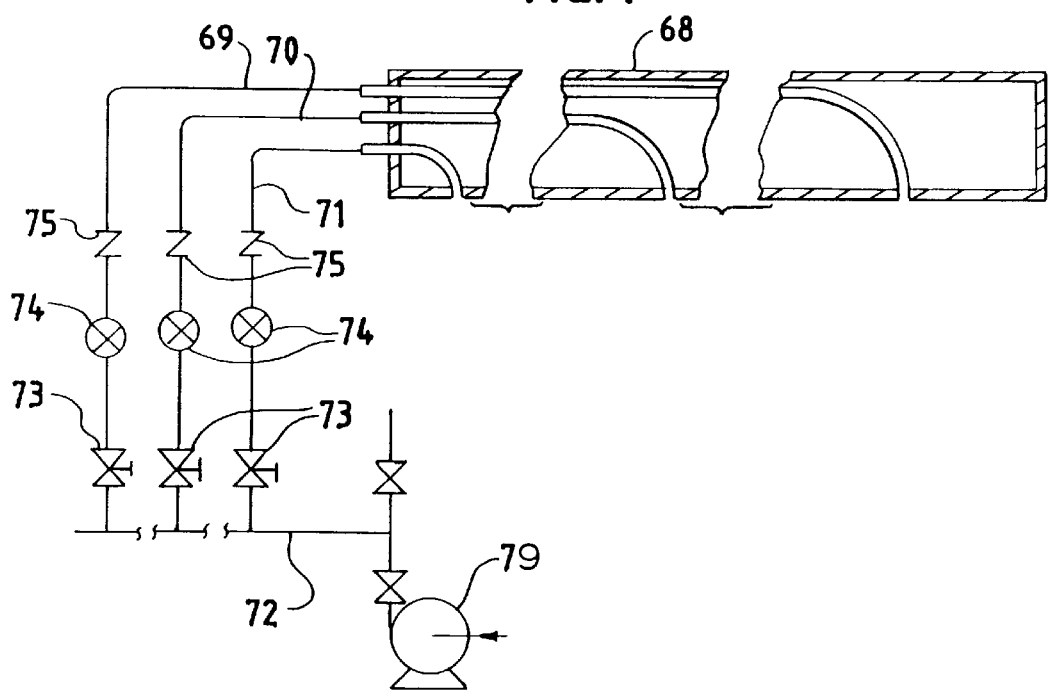
FIG. 7 is a fragmentary elevational view, partly in section of the removable distributive lance with valve flow monitor and check valve on each individual discharge tube.

Referring to FIGS. 5, 6, and 7, the reactor pressurizing section 60 has a manway 61, a rupture disc 62, and valve 63, for passage of gas into and out of the reactor 10. The reactor 10 also contains a movable internal piston 11 that is supported by a piston frame 12. A laser level indicator 25 mounted on the end section 60 is used to measure the position of the piston 11 in the reactor 10. The piston 11 has a first surface 13 and an opposed, curved second surface 14.

The discharge end 64 of the reactor 10 has a vent and sampling knife gate valve 65 and a knife gate valve 66. A packed sealing gland 67 is connected to the knife gate valve 66. A movable distributive lance 68 passes through the packed gland 67 and the knife gate valve 66, and through the length of the reactor 10 almost to the piston 11.

Small tubing lines 69, 70, and 71 represent a plurality of feed lines to individual discharge points typically located approximately every two feet along the removable distributive lance 68. The small tubing lines 69, 70, and 71 are sealed at the point where they pass through the wall and end of the removable distributive lance 68. The void space around the small tubing lines inside the removable distributive lance 68 is filled to prevent buoyancy. Reagents are fed to the reactor 10 by a pump 79 through a feed header 72. Gas for purging is also introduced into the header 72. Each of the plurality of small tubing lines is individually connected to the feed header 72 through a metering control valve 73, a flow indicator 74, and a check valve 75. The arrow 76 indicates the direction of withdrawal of the removable distributive lance.

Referring to FIGS. 5, 6, and 7, a typical batch preparation sequence for the reactor in the horizontal position involves the following steps. The start condition assumes that piston 11 is inserted in the discharge (left) end of reactor 10, adjacent the reactor end section 64, with the product from any preceding reaction fully discharged. The distributive lance 68 would have been removed at the beginning of the previous reaction. The valves 65 and 66 would be closed.

1. Open the valves 65 and 63, and pressurize with air (source not shown) through the valve 65, moving the piston to the desired position to allow a head space of approximately 18 inches based on the calculated volume of the reaction batch about to be prepared. Determine the correct piston position by use of the laser distance measuring device 25. Close the valve 63, and disconnect air from the valve 65, leaving the valve 65 open.

2. Insert the distributive lance 68 into the reactor through the packed gland 67 and the valve 66 to the point where the distributive lance 68 almost reaches the piston 11. Tighten the packed gland 67 to prevent escape of reactants.

3. By means of the pump 79, meter reactants into the reactor 10 through all of the plurality of small tubing lines represented by the tubing lines 69, 70, and 71. Balance the inlet flow rates by adjusting the metering valves represented by the metering valve 73, monitoring flows by means of flow meters (represented by flow meter 74). When all reactants have been pumped into the reactor 10, purge the pump 79, the header 72, and the small tubing lines being used, represented by small tubing lines 69, 70, and 71, with appropriate gas flow (source not shown). Mix and/or purge the reactants in the reactor 10 by continuing to flow gas through all small tubing lines open to the reactor 10. The valve 65 remains open through the fill/mix/purge sequence as a vent. Maintain the desired piston location by air pressurizing thorough the valve 63 (source not shown).

4. When the fill/mix/purge sequence is complete, withdraw the distributive lance 68 just to the point where the valve 66 can be closed. Close the valve 66. Remove the distributive lance 68 and the packed gland 67.

5. After the reaction has reached completion, check that the laser position indicator 25 is operative and begin slowly pressurizing (source not shown) with air through the valve 63 until the piston 11 moves to fill the void space with the reacted product. At that point close the valve 65 and stop pressurizing through the valve 63. Open the product outlet valve 66 and discharge reactor contents 80 out of the reactor 10 (e.g., via a pump, not shown). By means of air pressure (source not shown) through the valve 63, maintain pressure on the piston side 13 and observe movement of the piston 11 using the laser position indicator 25. As the piston 11 moves, the annular seal 44 exerts a wiping action along the interior of the reactor side wall 15. The concave piston section 14 mirrors the curved end reaction 64 of the reactor 10. Continue discharging until the piston section 14 meets tightly within the curved surface 64, ensuring complete product removal. Close the valve 66.

The foregoing describes preferred embodiments of the invention, and various changes and modifications can be made thereto without departing from the scope of the invention, which is defined by the appended claims.

What is claimed is:

1. A reactor for the production of flowable viscous products comprising:
   a) a horizontally disposed hollow tank having first and second end portions and a cylindrical sidewall interconnecting the first and second end portions;
   b) at least first and second valves for the passage of fluids into and out of said tank, respectively;
   c) at least one end valve adapted for the removal of flowable viscous material from said tank;
   d) a distributive lance inserted into said tank for uniformly adding reactants and injecting gas to mix fluids in said tank;
   e) a cylindrical piston in said tank, said piston having an annular periphery with a seal extending radially outwardly thereof for engagement with the interior surface of said tank sidewall; and,
   f) means for moving said piston within said tank, between a full position and a discharged position;

said first valve being associated with said lance to control the flow of fluids there through and said second valve communicating with the interior of said tank to allow exhaust of gas from within said tank.

2. The reactor of claim 1, further including apparatus for determining the position of the piston within the tank.

3. The reactor of claim 2, wherein the apparatus for determining piston location comprises a laser level indicator.

4. The reactor of claim 1, wherein the means for discharging reacted product from the reactor comprises a pressurized fluid.

5. The reactor of claim 4, wherein said pressurized fluid comprises compressed air.

6. The reactor of claim 1, wherein said piston has a convex surface and said tank second end portion is internally concave for mating with said convex piston surface.

7. The reactor of claim 1, wherein said seal contains an outer low-friction cover at the point of engagement of said seal with the surface of said tank sidewall.

8. The reactor of claim 7, wherein said low-friction cover comprises a polymer selected from the group consisting of polytetrafluoroethylene and nylon.

9. The reactor of claim 1, wherein the reactor is in the form of a mobile transport tank.

10. A method of making a flowable, viscous product comprising the steps of:

a) introducing reactants to the tank of the reactor of claim 1 through said distributive lance with said piston in said first position;

b) mixing said reactants in said tank by introducing mixing gas to said reactants through said distributive lance;

c) forming a flowable material in said tank by reacting said reactants; and d) expelling said flowable material from said tank by moving said piston from said full position to said discharged position.

11. The method of claim 10, further including apparatus for determining the position of the piston within the tank.

12. The method of claim 11, wherein the apparatus for determining piston location comprises a laser position indicator.

13. The method of claim 10, wherein the means for discharging reacted product from the reactor comprises a pressurized fluid.

14. The method of claim 13, wherein said pressurized fluid comprises compressed air.

15. The method of claim 10, wherein said piston has a convex surface and said tank second end portion is internally concave for mating with said convex piston surface.

16. The method of claim 10, wherein said seal contains an outer low-friction cover at the point of engagement of said seal with the surface of said tank sidewall.

17. The method of claim 16, wherein said low-friction cover comprises a polymer selected from the group consisting of polytetrafluoroethylene and nylon.

18. The method of claim 10, wherein the reactor is in the form of a mobile transport tank.

* * * * *